June 11, 1940.  R. C. SPECHT  2,204,192
METHOD OF MAKING BARIUM CHLORIDE
Filed Feb. 5, 1938
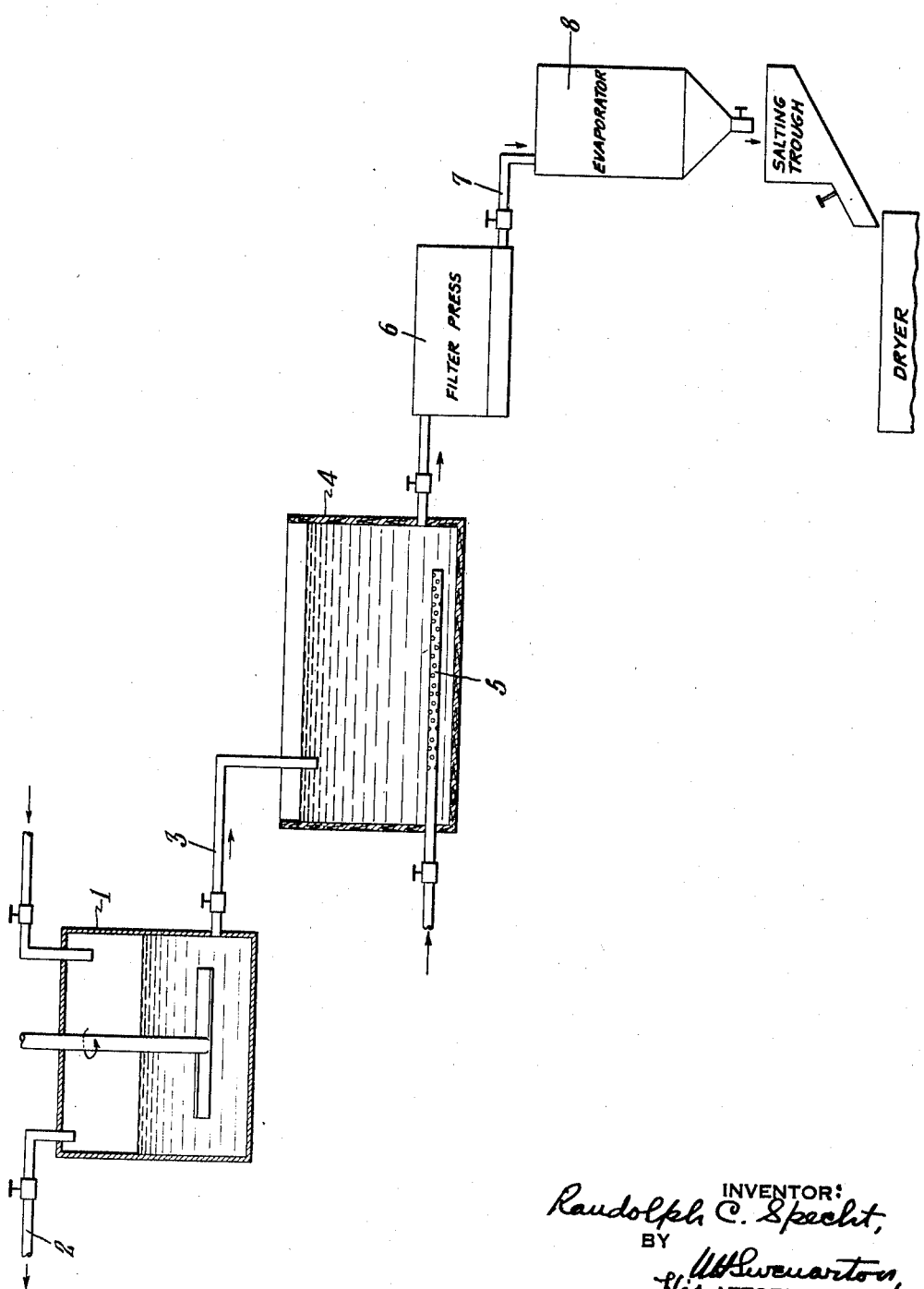
INVENTOR:
Randolph C. Specht,
BY
His ATTORNEY.

Patented June 11, 1940

2,204,192

UNITED STATES PATENT OFFICE 2,204,192

METHOD OF MAKING BARIUM CHLORIDE

Randolph C. Specht, St. Albans, W. Va., assignor to Barium Reduction Corporation, Charleston, W. Va., a corporation of Delaware Application February 5, 1938, Serial No. 188,850

6 Claims. (Cl. 23—90)

This invention relates to the production of barium chloride and has for its principal objects the provision of an economical and expeditious method of making commercial barium chloride from barium sulphide and which product is of a relatively high degree of purity and which is particularly suitable for technical purposes requiring a barium chloride of high quality and even a reagent for chemical analyses.

In practice, commercial barium chloride is generally made by subjecting barium hydroxide, carbonate or sulphide to the action of a solution of hydrochloric acid, effecting the concentration of the resultant barium chloride liquor and then recovering the barium chloride content thereof as a dry salt. However, such method of manufacture results in a product which contains a considerable percentage of insoluble matter and soluble impurities, such as nitrates, chlorates or sodium, strontium and calcium chlorides and heavy metal salts including especially ferrous metal salts. The production of a commercial barium chloride having a relatively small percentage of the foregoing impurities has heretofore been accomplished by effecting a purification of the resultant barium chloride obtained in the foregoing manner either by re-crystallization or by repeated precipitation thereof with alcohol, both of which methods are laborious and relatively expensive.

My investigations have led to the discovery that a commercial barium chloride which has a relatively low percentage of impurities can be accomplished without employing such recrystallization or precipitation steps.

In the accompanying drawing forming a part of this specification, in which I have illustrated a preferred apparatus in which my improved product may be carried out, the figure shown is a diagrammatic view of such apparatus.

In the production of commercial barium chloride of high quality in accordance with my invention, I preferably proceed as follows:

A barium sulphide solution, preferably of about 20% strength and which may be obtained for example by the lixiviation of commercial barium sulphide ash resulting from the reduction of barytes ore (barium sulphate), is heated to a temperature of between 60° C. to 80° C. in a closed iron tank 1 and to this solution is then slowly added, with constant stirring, ordinary commercial 20° Bé. hydrochloric acid. The hydrogen sulphide evolved during the reaction is drawn off through the discharge pipe 2. The reaction is allowed to continue until the resultant liquor in the tank is almost, but not quite, neutralized by the hydrochloric acid, at which time the addition of the hydrochloric acid is discontinued and the then barely alkaline liquor is then allowed to remain in the tank until the insoluble impurities, especially the insoluble sulphides, settle out therefrom.

The clear supernatant or top liquor is then drawn off through the delivery pipe 3 and introduced into a separate tank, such as the wooden tank 4, wherein the liquor is slightly acidified with commercial hydrochloric acid. While still in this latter tank, the barium chloride liquor is then subjected to the action of a current of air and chlorine gas, admixed together, in order to oxidize the impurities such as iron and sulphur compounds and the like. Preferably the said oxidizing gases are slowly introduced into the liquor, adjacent the bottom of the mixing tank, through the perforated inlet pipe 5, the air constituent of the air and chlorine mixture being preferably under sufficient pressure to effect the substantial agitation of the liquor.

The introduction of the chlorine gas is continued until the impurities in the solution are completely oxidized, as can be indirectly ascertained by testing with potassium-iodide starch-indicating paper in the well known manner. The resultant barium chloride liquor is then neutralized with a compound that will not contaminate the same, preferably with barium hydroxide or barium carbonate and the mixture is permitted to settle. In lieu of chlorine gas, other common oxidizing agents such as hydrogen peroxide or barium peroxide, which also like chlorine gas will not contaminate the barium chloride, may be employed.

After the impurities in the barium chloride liquor have settled out, the supernatant solution is then conducted to a filter press, such as the press 6, preferably a wooden filter press, wherein the last traces of insoluble matter are filtered out and the filtrate is then transferred through a conduit 7, preferably formed of rubber, glass or stainless steel to an evaporator 8, preferably also constructed of rubber, glass or stainless steel or like resistant material that will not be attacked by the barium chloride liquor, and pure barium chloride is then salted out from the resultant concentrated liquor which is obtained from said evaporator. The resultant barium chloride crystals so recovered are introduced into a suitable dryer, preferably constructed of stainless steel or of like inert material which will not contaminate the product and therein the hydrated crystals (BaCl$_2$.2H$_2$O) are dried to remove therefrom all water other than the combined water or of water of crystallization.

In those cases where it is desired to produce barium chloride of a quality corresponding to a chemically pure reagent, the supernatant mother liquor obtained in the final crystallization stage is discarded or employed for other purposes but otherwise it is returned to the treating tank and mixed with the liquor undergoing treatment to again pass through the process.

The temperature of the liquor from the commencement of the process up to and including the filtering operation is desirably maintained between 60° C. and 80° C., as such temperatures prevent crystallization and promote settling of the insoluble impurities in the liquor and furthermore preclude the escape of the chlorine or oxidizing agent employed without the same being afforded an opportunity to effect the oxidation of thhe oxidizable impurities.

The hydrochloric acid which is employed in the first and second acidulating steps is selected for this purpose because it is entirely compatible with the pure end product of the process, namely barium chloride and therefore does not serve to contaminate the same.

The hydrogen sulphide evolved from the process is either recovered by absorption of the same in a suitable absorbent or the same may, if desired, be subjected to a combustion process in order to recover sulphur therefrom in the well known manner.

The concentration of the barium sulphide employed should not be less than about 10% strength, nor preferably of a greater concentration than about 25% strength.

Various changes in the method of procedure and the compounds employed may be made without departing from the spirit of my invention as embraced within the scope of the appended claims.

Having thus described my invention, what I claim and desire to obtain by United States Letters Patent is:

1. The method of making barium chloride, which comprises effecting the settling out from an impure concenterated barium chloride liquor, while the same is in a substantially neutral but still barely alkaline condition, of the insoluble impurities thereof, separating the supernatant liquor, slightly acidifying the same, then introducing into the liquor an oxidizing medium which is incapable of reacting with the barium chloride content of the liquor to produce a compound other than barium chloride and thereby effecting the oxidation of the oxidizable impurities in the liquor, then when such impurities are completely oxidized, neutralizing the solution with a barium compound, separating the insoluble impurities from the liquor, then evaporating the same, effecting the crystallization of the barium chloride content of the liquor and then recovering and drying the crystallized barium chloride.

2. In a method of making barium chloride, the steps which comprise subjecting impure barium chloride liquor containing oxidizable, soluble impurities to the action of a non-contaminating oxidizing agent, which will not react in the mixture to produce a compound other than barium chloride, while in the presence of an excess of hydrochloric acid, neutralizing the excess acid with a member of a group consisting of barium hydroxide and barium carbonate, separating the oxidized insoluble impurities from the liquor, then evaporating the liquor and crystallizing out the barium chloride and drying the resultant crystals to remove any uncombined water therefrom.

3. A method as claimed in claim 1, wherein the barium compound employed to neutralize the oxidized liquor comprises a member of a group of barium compounds consisting of barium hydroxide and barium carbonate.

4. A method as claimed in claim 1, wherein the oxidizing medium which is introduced into the liquor, comprises compressed chlorine and air.

5. A method as claimed in claim 1, wherein the oxidizing medium introduced into the liquor comprises chlorine gas.

6. A method as claimed in claim 1, wherein the oxidizing medium introduced into the liquor comprises a member of a group of oxidizing agents consisting of hydrogen peroxide and chlorine gas.

RANDOLPH C. SPECHT.